(12) United States Patent
Lim et al.

(10) Patent No.: US 11,197,571 B2
(45) Date of Patent: Dec. 14, 2021

(54) STEAM GENERATOR

(71) Applicant: LG ELECTRONICS INC., Seoul (KR)

(72) Inventors: Hakjoo Lim, Seoul (KR); Jaekyung Yang, Seoul (KR); Suyong Lee, Seoul (KR); Soochan Lee, Seoul (KR); Yongsoo Lee, Seoul (KR)

(73) Assignee: LG Electronics Inc., Seoul (KR)

(*) Notice: Subject to any disclaimer, the term of this patent is extended or adjusted under 35 U.S.C. 154(b) by 322 days.

(21) Appl. No.: 16/299,945

(22) Filed: Mar. 12, 2019

(65) Prior Publication Data

US 2019/0357718 A1    Nov. 28, 2019

(30) Foreign Application Priority Data

May 23, 2018 (KR) .................. 10-2018-0058303

(51) Int. Cl.
*A47J 27/04* (2006.01)
*F22B 1/28* (2006.01)
*F22B 37/60* (2006.01)

(52) U.S. Cl.
CPC .............. *A47J 27/04* (2013.01); *F22B 1/288* (2013.01); *F22B 37/60* (2013.01); *A47J 2027/043* (2013.01)

(58) Field of Classification Search
CPC .. F22B 1/28; F22B 37/78; F22B 37/50; F22B 1/282; F22B 37/26; F22B 1/284;

(Continued)

(56) References Cited

U.S. PATENT DOCUMENTS 5,706,389 A    1/1998 Pohler
8,997,638 B2* 4/2015 Park .................. F24C 15/327
                                                99/476

(Continued)

FOREIGN PATENT DOCUMENTS

DE    19509772    7/1996
GB    886189      1/1962

(Continued)

OTHER PUBLICATIONS

Extended European Search Report in European Appln. No. 18189339.7, dated Feb. 20, 2019, 7 pages.

*Primary Examiner* — Robert J Utama
*Assistant Examiner* — Rachel R Rizzo
(74) *Attorney, Agent, or Firm* — Fish & Richardson P.C.

(57) ABSTRACT

A steam generator includes: a base module which has a water supply port for receiving steam water; and a steam module which is connected to an upper side of the base module, in which the steam module includes: a main body which has an upper surface and a lower surface; a flow pipe which is positioned at a central portion of the main body and into which the steam water flows; and a heater which supplies heat to the flow pipe, and in which another steam module is selectively coupled to an upper side of the steam module. According to this, the internal volume of the steam generator and the output of the heater provided in the steam generator can be selectively varied so as to provide an optimum output according to the volume of a cooking device in which the steam generator is installed.

17 Claims, 5 Drawing Sheets

(58) Field of Classification Search
CPC .......... F22B 1/288; F22B 37/60; F22B 37/47;
F22B 1/285; F22B 37/141; F24C 15/003;
F24C 7/08; F24C 3/12; F24C 15/00;
F24C 15/327; F24C 15/101; F24C 15/18;
F24C 15/08; F24C 7/085; F24C 15/2007;
F24C 15/20; F24C 7/067; F24C 15/166;
F24C 3/128; F24C 14/005; F24C 7/088;
F24C 15/006; F24C 13/00; F24C 15/325;
A47J 27/04; A47J 36/32; A47J 2027/043;
A47J 36/38; A47J 36/00; A47J 27/16;
A47J 36/2483; A47J 39/02; A47J
27/21058; F22B 5/26; F22D 7/00; F22D
5/08; F22D 5/34; A21B 3/04; A21B 1/24;
F04B 39/12; F04B 39/14; F04B 37/18;
F04B 37/10; H05B 6/6479; H05B 6/108;
H05B 6/6488; H05B 6/12; H05B 6/36;
H05B 3/42; H05B 1/0297; H05B 3/20;
H05B 6/6485; H05B 3/0014; A47L
15/4234; A47L 15/0049; A47L 15/4285;
A47L 13/225; D06F 39/008; D06F 39/14;
C23C 16/4481; A61M 16/1085; A61M
16/1075; A61M 16/1095; A61M 16/0875;
A61M 16/109; A61M 16/021; A61M
39/12; A61M 16/0816; A61M 16/0883;
A61M 16/16; B01D 1/0017; B01D 1/22;
B01D 46/0027; F24H 1/122; F24H 1/106;
F16L 25/10; F24F 6/02; F24F 11/00;
F24F 6/12; F24F 6/18; F24F 11/0008;
F24F 13/20; F24F 6/00; B08B 3/02;
B08B 3/04; A23L 5/13; H01R 13/005;
G01F 23/265; H05K 7/1061; H05K 7/20;
H01L 24/75; H01L 24/81
See application file for complete search history.

(56) References Cited

U.S. PATENT DOCUMENTS

| | | | | |
|---|---|---|---|---|
| 2016/0222508 | A1* | 8/2016 | Schoepp et al. | ..... C23C 16/4481 |
| 2016/0310689 | A1* | 10/2016 | Evans et al. | |
| 2016/0351526 | A1 | 12/2016 | Boyd et al. | |

FOREIGN PATENT DOCUMENTS

| | | | | |
|---|---|---|---|---|
| JP | H07198103 | | 8/1995 | |
| JP | H07198103 A | * | 8/1995 | ................ F22B 1/28 |
| JP | 2017516291 | | 6/2017 | |
| KR | 10-2009-0125480 | | 12/2009 | |
| KR | 2020110002193 | | 3/2011 | |
| KR | 101521128 | | 5/2015 | |
| KR | 1020160029251 | | 3/2016 | |
| KR | 1020170025644 | | 3/2017 | |
| WO | WO-2016073656 A1 | * | 5/2016 | ................ F22B 1/28 |

* cited by examiner

STEAM GENERATOR

CROSS-REFERENCE TO RELATED APPLICATIONS

The present application claims priority under 35 U.S.C. 119 and 35 U.S.C. 365 to Korean Patent Application No. 10-2018-0058303, filed on May 23, 2018, which is hereby incorporated by reference in its entirety.

FIELD

The present invention relates to a steam generator.

BACKGROUND

A cooking device is a household appliance that heats a cooking material using electricity or gas. In a case where the cooking material is cooked in the cooking device, the moisture of the cooking material can be evaporated by the heating process. Accordingly, there is a new cooking device having a steam function for supplying steam to the cooking material to prevent the moisture of the cooking material from being evaporated and dried. Such a cooking device is provided with a steam generator for generating steam.

Examples of the cooking device provided with the steam generator include an oven, a range, and a coffee machine.

The steam generator includes a water storage tank in which water supplied from an external water source is stored, a heating pipe through which water supplied from an external water source flows, and a heating unit which heats water stored in the water storage tank or the water flowing through the heating unit.

In addition, the steam generator may be configured to generate saturated steam by heating the water supplied from an external water source and to supply the superheated steam generated by heating the saturated steam to the cooking chamber of the cooking device.

The related art information related to this is as follows.

Korea patent publication number: 10-2009-0125480 (publication date: Dec. 7, 2009)

Title of the Invention: Steam Generator and Steam Cooking Device including Same

The steam generator in the related art has the following problems.

Since the shape and output of the steam generator of the related art are fixed, there is a problem that it is difficult to provide optimum performance according to the cavity provided in various volumes for each cooking device. For example, a steam generator having a relatively low heater output has a problem of insufficient performance for use in a relatively high volume cavity.

If a new heater is developed which expands the shape and output of the heater according to the relatively high volume cavity, there is a problem that a new standard must be acquired according to relevant laws and regulations. In other words, the steam generator having different shapes and outputs must be individually developed according to cavities provided in various volumes for each cooking device, resulting in an increase in manufacturing cost and a decrease in productivity.

In addition, there is a problem that an accessory component suitable for the shape and output of the individually developed steam generator must be newly manufactured.

In addition, if an individual steam generator is produced for each volume of the cavity, standardization or common use of the steam generator becomes difficult, resulting in poor economic efficiency.

SUMMARY

An objective of the present invention is to provide a steam generator that can vary an internal volume for accommodating the water of the steam generator and the output of the heater according to the internal volume.

Another objective of the present invention is to provide a steam generator in which a plurality of modules capable of independently generating steam can be assembled or disassembled.

Another objective of the present invention is to provide a steam generator that is capable of preventing leakage of steam in a case where the plurality of modules are assembled.

Still another objective of the present invention is to provide a steam generator that is formed so that the coupling and separation between heaters can be easily performed in order to vary the output of the heater.

Still another object of the present invention is to provide a steam generator that can vary the output of a heater using a heater of the existing standard.

According to an embodiment of the present invention, there is provided a steam generator including: a base module which has a water supply port for receiving steam water; and a steam module which is connected to an upper side of the base module, in which the steam module includes: a main body which has an upper surface and a lower surface; a flow pipe which is positioned at a central portion of the main body and into which the steam water flows; and a heater which supplies heat to the flow pipe, and in which another steam module is selectively coupled to an upper side of the steam module.

According to this, the internal volume of the steam generator and the output of the heater can be selectively varied so as to provide an optimum output according to the volume of the cavity in which the steam generator is installed.

In addition, another steam module may have the same structure as the steam module.

In addition, an upper end portion of the steam module may be inserted into a lower end portion of another steam module.

In addition, the main body may include a latching protrusion which protrudes upward from one side of the upper surface; and a latching groove which is formed on one side of the lower surface to be recessed upward.

In addition, a lower end portion of the latching groove may have a shape corresponding to an upper end portion of the latching protrusion.

In addition, in the latching protrusion, an upper fastening hole for guiding insertion of a fastening member may be formed in the central portion. A lower fastening hole for fastening the fastening member may be formed in the fastening groove. According to this, a single fastening member can be stably fastened through the latching protrusion and the latching groove.

In addition, the flow pipe may be connected to the water supply port such that the central axes of the flow pipe and the water supply port are equal to each other.

In addition, the flow pipe may include: an expanded pipe which is formed on the lower side so as to expand an inner diameter thereof; and an insertion portion which extends upward from the upper surface.

In addition, the insertion portion provided in the steam module may be inserted into the expanded pipe provided on another steam module.

In addition, the steam module may further include a packing which has a diameter larger than an outer diameter of the expanded pipe and smaller than an inner diameter of the insertion portion.

In addition, the packing may seal between an inserting portion provided in the steam module and an expanded pipe provided in another steam module.

In addition, the heater may include: an insertion terminal which protrudes upward; and an integration portion that is opened upward from the lower end portion.

In addition, the integration portion may have a tapered inner space.

In addition, the insertion terminal may include a pogo pin that can move as the force is applied.

In addition, the insertion terminal provided in the steam module may be inserted into the integration portion provided in another steam module so as to be electrically connected.

In addition, the base module may be detachably coupled to the steam module.

The steam generator according to the embodiment of the present invention having the above-described structure has the following effects.

Firstly, since the internal volume of the steam generator and the output of the heater can be installed while being varied according to the volume of the cavity, it is possible to provide optimized performance for each volume of the cavity without any need for separate development or manufacture.

Secondly, since the internal volume of the steam generator and the module for varying the output of the heater can be easily coupled or separated, the installability, convenience, and manageability are improved.

Thirdly, there is an advantage that the reliability of the product can be improved because leakage of steam generated in the module can be prevented, and the heaters provided in the respective modules can be stably coupled or separated.

Fourthly, the components included in the steam generator can be standardized and shared so that the manufacturing cost of the product can be reduced, and the components can be easily managed for each component.

Fifthly, because it is possible to provide various heater outputs by using heaters of existing standards, it is not necessary to acquire new standard according to the heater shape and output variable, so that the productivity for commercialization is improved.

DETAILED DESCRIPTION

Reference will now be made in detail to the embodiments of the present disclosure, examples of which are illustrated in the accompanying drawings.

In the following detailed description of the preferred embodiments, reference is made to the accompanying drawings that form a part hereof, and in which is illustrated by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s).

Figure 1:
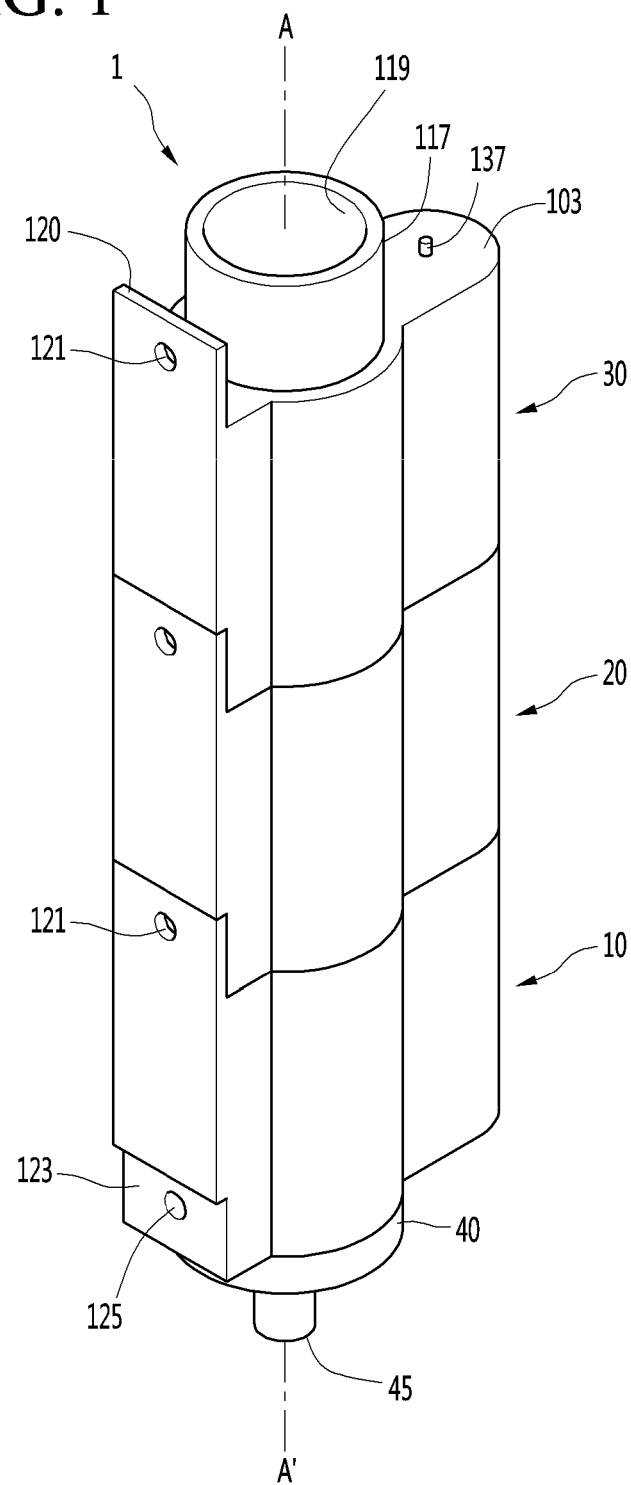
FIG. 1 is a view illustrating an outer appearance of a steam generator according to an embodiment of the present invention.
Figure 2:
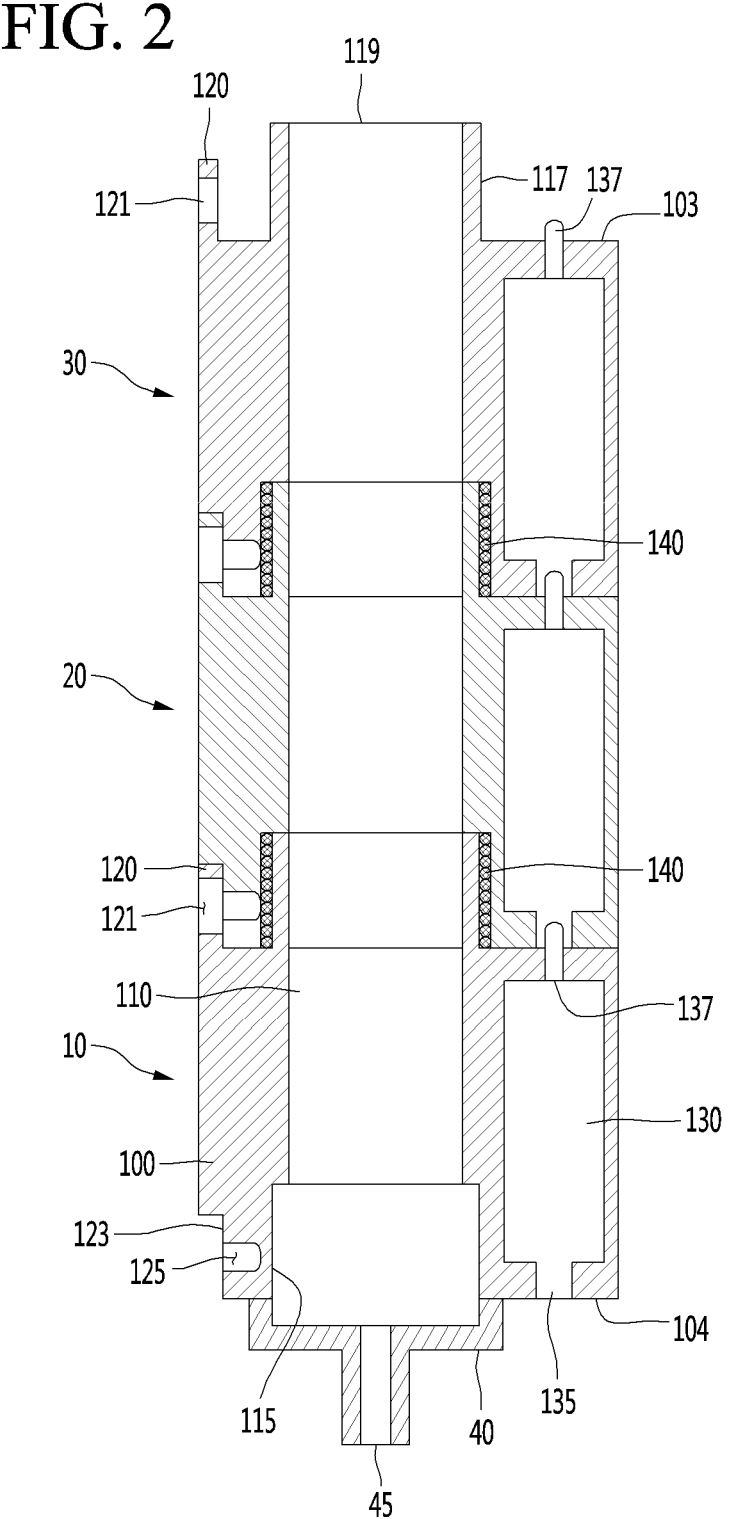
FIG. 2 is a cross-sectional view taken along line A-A' of FIG. 1.
Figure 3:
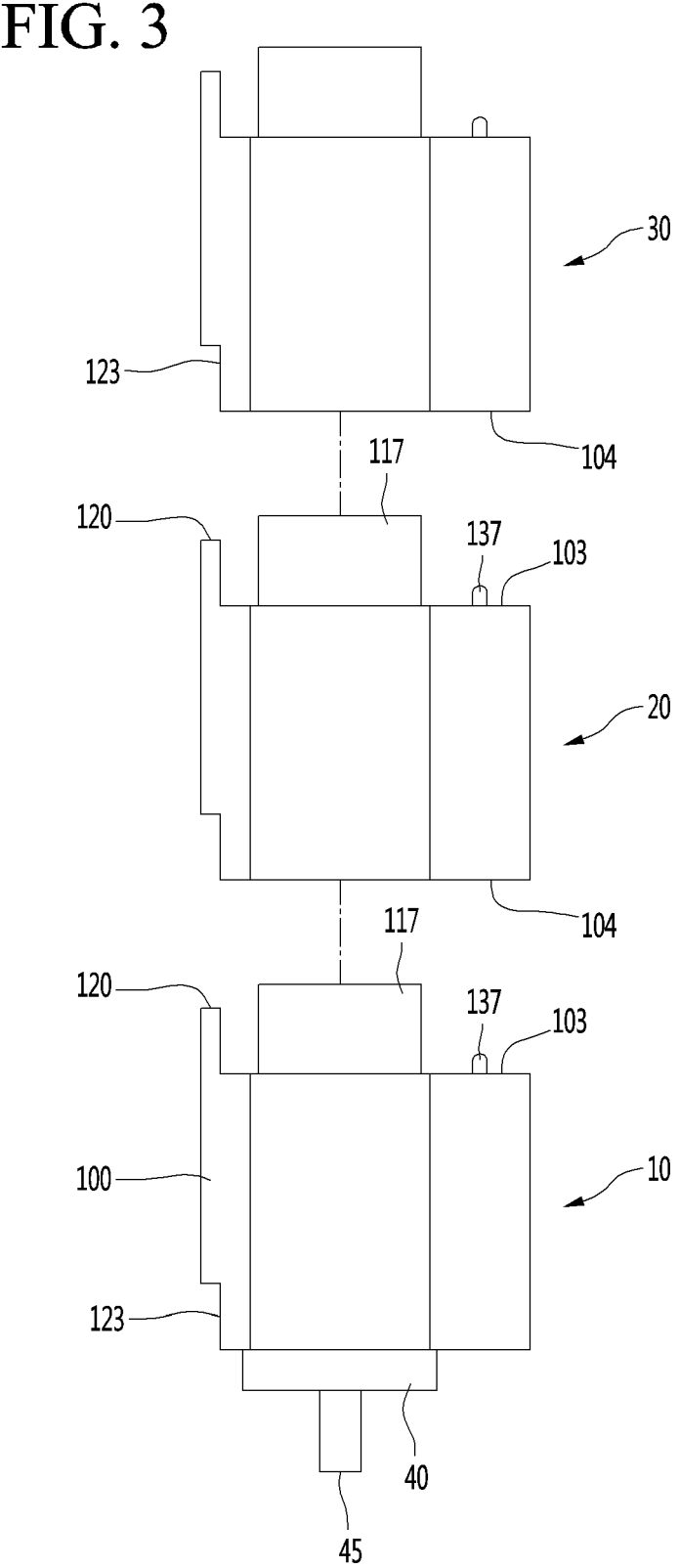
FIG. 3 is a view illustrating a separated outer appearance between modules of a steam generator according to an embodiment of the present invention.

FIG. 1 is a view illustrating an outer appearance of a steam generator according to an embodiment of the present invention, FIG. 2 is a cross-sectional view taken along line A-A of FIG. 1, and FIG. 3 is a view illustrating a separated outer appearance between modules of a steam generator according to an embodiment of the present invention.

With reference to FIGS. 1 to 3, the steam generator 1 according to an embodiment of the present invention includes a plurality of modules 10, 20, and 30 which can independently generate steam by receiving steam water, respectively, so as to be coupled or separated. For example, according to an internal cavity volume of a cooking device, the number of modules 10, 20, and 30 may increase or decrease.

Hereinafter, the description will be made on the basis that the steam generator 1 has three modules 10, 20 and 30.

The steam generator 1 includes a first module 10, a second module 20 which is coupled to the upper side of the first module 10, a third module 30 which is coupled to the upper side of the second module 20, and a base module 40 which is coupled to the lower side of the first module 10.

The first module 10, the second module 20, and the third module 30 may be formed to have the same shape and configuration. Accordingly, each of the first module 10 to the third module 30 may be referred to as a steam module.

The base module 40 may be detachably coupled to the lower end portion of the first module 10.

Meanwhile, since the first module 10 to the third module 30 are formed in the same structure, the base module 40 can detachably be coupled to the lower end portions of the first module 10 to the third module 30.

However, in a preferred embodiment, the base module 40 may be coupled to the lower end portion of the first module 10 located at the lowermost end.

The base module 40 may include a water supply port 45 connected to a water supply pipe (not illustrated) to provide steam water.

The water supply pipe (not illustrated) may be connected to a water supply device to allow the steam water to flow to the water supply port 45. The steam water flowing into the water supply port 45 may flow into the flow pipe 110 provided in the first module 10 to the third module 30.

The steam water is heated by the heat provided by the heater 130 and can exist in the flow pipe 110 according to the degree of heating by being mixed in the form of a liquid phase (water), saturated steam, superheated vapor, or the like.

The water supply port 45 may be formed as a hole opened along the central axis of the base module 45 in an up-and-down direction.

The central axis of the base module 45 is the same as the central axis of the flow pipe 110 provided in the first module 10 to the third module 30. In other words, the water supply port 45 may protrude downward from the bottom surface of the base module 40 along the central axis of the steam generator 1.

The water supply port 45 may be connected to the flow pipe 110 to be described later to communicate therewith.

Meanwhile, the first module 10 may include a main body 100 having an upper surface 103 and a lower surface 104, a flow pipe 110 providing a flow path for steam water or steam, and a heater 130 which provides heat to heat the steam water.

The main body 100 may form the outer appearance of the module.

The upper surface 103 and the lower surface 104 of the main body 100 can guide so that the heater 130 provided in another module on one side of the main body 100 is coupled in the up-and-down direction.

In addition, the upper surface 103 and the lower surface 104 of the main body 100 may be guided so as to be assembled or integrated with another module on the other side of the main body 100.

Here, the "integration" can be defined as the formation of a single shape body by being the two shape bodies in contact with each other. For example, in a case where one shape is a '┐' shape and the other shape is a '└' shape, if the shapes of two shape bodies are joined, one shape can be formed which is '□' □shape.

The main body 100 may include a latching protrusion 120 and an upper fastening hole 121 for coupling with another module having the same configuration, that is, other modules.

The latching protrusion 120 may be formed to guide insertion and stable coupling of other modules. In detail, the latching protrusion 120 may protrude upward from the upper surface 103 of the main body 100. For example, the latching protrusion 120 may be formed as a plate extending vertically from the outer end of the upper surface 103. In other words, the latching protrusion 120 may include a '└' shape.

In other words, the latching protrusion 120 may form a groove in which another module is inserted between the outer circumferential surfaces of the flow pipe 110. The grooves may be formed so that the bottom surface and both side surfaces thereof are perpendicular to each other so that a hexahedron is inserted. Therefore, the lower surface 104 of one of the modules can be inserted into the groove formed by the latching protrusion 120 of another module.

When the main body 100 of one module is inserted along the latching protrusions 20 of another module, the latching grooves 123 and the latching protrusions 120 to be described later can be integrated. According to this, a stable coupling between a plurality of modules can be achieved.

The upper fastening hole 121 may be formed in the latching protrusion 20 as a hole into which the fastening member is inserted. For example, the upper fastening hole 121 may be formed in the center of the latching protrusion 120 in a direction toward the central axis of the flow pipe 110.

The upper fastening hole 121 may be formed so as to communicate with a lower fastening hole 125 to be described later for fastening between modules. Therefore, in a case where the upper fastening hole 121 and the lower fastening hole 125 are coaxially aligned with each other, a fastening member can be inserted into the upper fastening hole 121 and the lower fastening hole 125.

In other words, in a case where the latching groove 123 of another module is inserted into the groove formed by the latching protrusion 120, the fastening member passing through the upper fastening hole 121 and the lower fastening hole 125 is fastened so that the two modules can be stably coupled. Accordingly, the coupling between the modules is stably performed.

In addition, the main body 100 may further include a latching groove 123 formed to be integrated with the latching protrusion 120 and a lower fastening hole 125 communicating with the upper fastening hole 121 on the same axis.

The latching groove 123 may be formed in a shape corresponding to the latching protrusion 120 described above. The latching groove 123 and the latching protrusion 120 provided in one module may be formed on the upper surface 103 and the lower surface 104 respectively in the same lateral direction of the main body 100.

Therefore, the latching groove 123 and the latching protrusion 120 can guide the coupling of the other modules, respectively. For example, the latching protrusion 120 provided on the main body 100 of the second module 20 can be coupled with the latching groove 123 of the third module 30 from the upper side, and the latching groove 123 provided in the main body 100 of the second module 20 can be coupled with the latching protrusion 120 of the first module 10 from the lower side.

The latching groove 123 may be formed to be seated on the latching protrusion 120.

In other words, the latching groove 123 may be recessed upward from the lower surface 104 of the main body 100. For example, the latching groove 123 may be formed by vertically cutting the outer end portion of the lower surface 104 upward. In other words, the latching groove 123 may be formed in a "┐" shape.

The lower fastening hole 125 may be formed in the fastening groove 123 as a hole into which the fastening member is inserted. The lower fastening hole 125 may be positioned to communicate with the upper fastening hole 121 of another module. Specifically, when the two modules are coupled, the lower fastening hole 125 of one module can be positioned on the same horizontal axis as the upper fastening hole 121 of another module and can be fastened by one fastening member.

The flow pipe 110 may receive the steam water supplied from the water supply port 45. In a case where the steam water is converted into steam by the heat transferred from the heater 130, the flow pipe 110 can guide the discharge of the steam.

The flow pipe 110 may be located inside the main body 100. The flow pipe 110 may be positioned at the central portion of the main body 100. For example, the flow pipe 110 may be formed as a hole that opens in the up-and-down direction. Accordingly, the flow pipes 110 provided in each of the plurality of modules can be connected to communicate with each other in the up-and-down direction.

The internal volume of the flow pipe 110 may be 5 to 10 (unit: cc).

In addition, the outer circumferential surface of the main body 100 may form a rounded surface along the curvature of the flow pipe 110 in the front-rear direction.

The flow pipe 110 may further include an expanded pipe 115 formed at a lower portion thereof and an insertion portion 117 formed at an upper portion thereof.

The expanded pipe 115 may be formed at the lowermost end of the flow pipe 110. The expanded pipe 115 may be formed by further expanding the inner diameter of the flow pipe 110 so that the insertion portion 117 of another module located at the lower side is inserted.

In other words, the expanded pipe 115 may be formed to have an inner diameter larger than the inner diameter of the flow pipe 110.

The insertion portion 117 may be formed at the uppermost end of the flow pipe 110. Specifically, the insertion portion 117 may be formed to extend upward so that the flow pipe 110 protrudes from the upper surface 103 of the main body 100. The inner diameter of the insertion portion 117 may be the same as the inner diameter of the flow pipe 110.

Therefore, the insertion portion 117 can be inserted into the expanded pipe 115 of another module located on the upper side. The insertion portion 117 may abut on the flow pipe 110 of another module so as to communicate with each other to flow steam or steam water.

Meanwhile, in a case where a plurality of modules are coupled to each other, the insertion portion 117 positioned at the uppermost end can guide the discharge of steam generated in the plurality of flow pipes 110 communicated with each other. At this time, the discharged steam can flow toward the cavity of the cooking device. Therefore, the opening formed at the uppermost end of the insertion portion 117 may be referred to as a steam discharge port 119.

The heater 130 may be positioned in a lateral direction opposite to the lateral direction in which the latching protrusion 120 and the latching groove 123 are formed.

The heater 130 may be embedded in the main body 100 to provide heat to the flow pipe 110. For example, the heater 130 may be disposed outside the flow pipe 110 in the main body 100.

Accordingly, the heater 130 can transfer heat to the flow pipe 110 through heat generation, and the steam water existing in the flow pipe 110 receives the heat of the heater 130 to generate steam.

The heater 130 may include a heater having an output of 100 (W) or more to 300 (W) or less. In addition, the heater 130 may have a power density of 20 (W/cm^2) or less.

Meanwhile, the steam generator 1 according to the embodiment of the present invention can vary the output value of the heater 130 by controlling the number of the plurality of modules 10, 20, and 30 to be coupled.

In other words, the heaters 130 provided in the respective modules can be also coupled or separated. Accordingly, the heater 130, which provides heat to generate steam, must be accurately connected and stably coupled at the time of module-to-module coupling to provide the required output per cavity volume.

The heater 130 may form a terminal to be connected to one heater 130 at the upper portion and the lower portion.

The heater 130 may include an integration portion 135 and an insertion terminal 137 for coupling with a heater provided in another module.

The integration portion 130 may be formed under the heater 130. The insertion terminal 137 may be formed on the heater 130.

The insertion terminal 137 may protrude upward from the upper end of the heater 130. In other words, the insertion terminal 137 may be positioned to protrude on the heater 130. For example, the insertion terminal 137 may be formed in a concave-convex shape.

The integration portion 135 may be formed to extend downward from the lower end of the heater 130. The integration portion 135 may be opened downward. Therefore, the integration portion 135 can guide the insertion terminal 137 of the heater provided in the other module to be inserted.

In other words, the integration portion 135 and the insertion terminal 137 provided in different modules from each other can be coupled so as to be electrically connected to each other. In one example, the insertion terminal 137 may include a pogo pin.

In this case, when the insertion terminal 137 of the heater provided in another module is inserted upwardly into the integration portion 135 of the heater provided in any one of the modules, the upper end portion of the insertion terminal 137 can abut on and come in contact with the integration portion 135.

At this time, by the contact of the insertion terminal 137, the switch for electrical connection between the respective heaters can be switched to the ON state. Therefore, the heaters 130 provided in the respective modules can be electrically connected.

According to this, the electrical connection between the plurality of heaters 130 can be safely performed.

In a case where a plurality of heaters 130 provided in each of the plurality of modules are connected to each other, a wire connected to an external power source may be connected to the insertion terminal 137 of the heater provided in the uppermost end module and the integration portion 135 of the heater provided in the lowermost end module. Accordingly, the plurality of heaters 130 may perform a heat generating function by electricity provided from the electric wire.

Eventually, when a plurality of modules are coupled, each of the heaters 130 can be coupled with each other. According to this, it is possible to adjust the number of modules to be coupled and varied so as to provide optimized output according to the volume of the cooking device, that is, the volume of the cavity.

The first module 10 may further include a packing 140 for preventing leakage when coupling one module to another module.

The packing 140 may be positioned so as to be closely abutted along the outer circumferential surface of the insertion portion 117 provided in one module. The packing 140 may be positioned to be inserted into the inside of the expanded pipe 115.

In one example, the packing 140 may include a ring shape. In this case, the diameter of the packing 140 may be smaller than the inner diameter of the expanded pipe 115 and larger than the outer diameter of the insertion portion 117. For example, the thickness of the packing 140 may be set to a value obtained by subtracting the outer diameter of the insertion portion 117 from the inner diameter of the expansion tube 115.

The packing 140 can be fitted between the outer side of the insertion portion 117 provided in one module and the inner side of the expanded pipe 115 provided in another module. In addition, the packing 140 may be formed of a synthetic resin, an oil-based caulking, silicone, rubber, or the like in order to enhance watertightness and airtightness.

In a case where the two modules 10, 20 and 30 are coupled and the insertion portion 117 is inserted into the expanded pipe 115, the packing 140 can be sealed so as to prevent the steam water or steam flowing along the flow pipe 110 from leaking into the gap between the two modules. Therefore, it is possible to prevent water leakage when coupling modules.

As described above, the second module 20 and the third module 30 may be formed in the same manner as the first module 10. In other words, the second module 20 and the third module 30 may have the same structure, shape, and configuration as those of the first module 10.

In other words, the second module 20 and the third module 30 may also include the main body 100, the flow pipe 110, the heater 130, and the packing 140 described above, respectively.

Therefore, the detailed description of the second module 20 and the third module 30 refers to the detailed description of the first module 10 described above.

Figure 4:
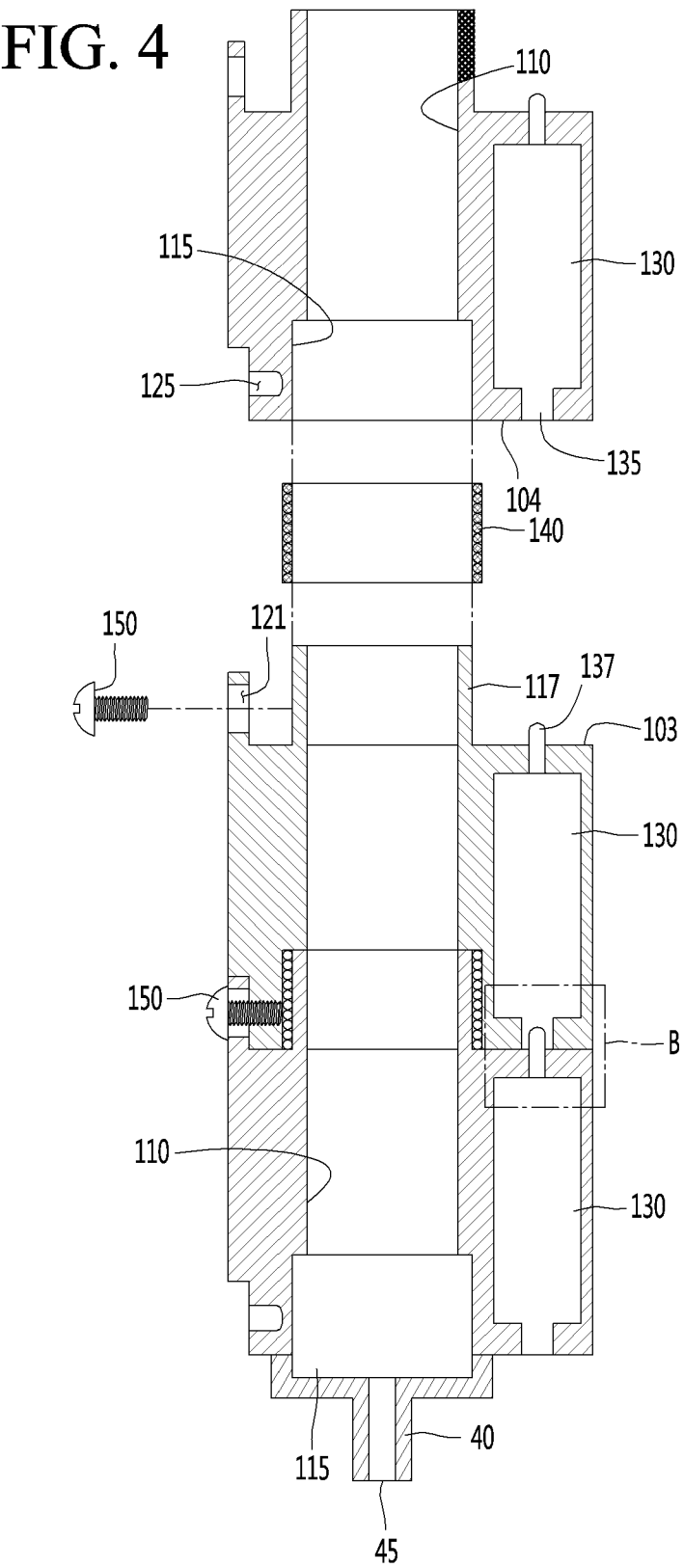
FIG. 4 is a cross-sectional view illustrating a state where the modules of the steam generator are coupled or disassembled according to an embodiment of the present invention.

FIG. 4 is a cross-sectional view illustrating a coupling or disassembly between modules of a steam generator according to an embodiment of the present invention.

With reference to FIG. 4, the process of coupling and disassembling between modules of the steam generator according to the embodiment of the present invention will be described.

With reference to FIG. 4, first, the base module 40 may be coupled to the lower surface 104 of the first module 10. At this time, the water supply port 45 of the base module 40 and the expanded pipe 115 of the first module 10 can be disposed with the same central axis. In other words, the water supply port 45 and the flow pipe 110 of the first module 10 may be connected with each other.

The second module 20 can be selectively coupled to the first module 10 according to the cavity volume of the cooking device in which the steam generator 1 is installed. For example, in a case where the output of the steam generator 1 including only the first module 10 is insufficient as compared with the volume of the cavity, the user may couple the second module 20 on the first module 10, so that the output of the steam generator 1 can increase.

In other words, the lower surface 104 of the second module 20 can be seated on the upper surface 103 of the first module 10.

More specifically, the latching groove 123 of the second module 20 can be seated on the latching protrusion 120 of the first module 10. In other words, the second module 20 can be inserted into the groove formed between the latching protrusion 120 and the flow pipe 110 of the first module 10. At this time, the upper fastening hole 121 of the first module 10 and the lower fastening hole 125 of the second module 20 are aligned so that the fastening member 150 can be inserted therein.

The coupling member 150 may be inserted into the upper fastening hole 121 and the lower fastening hole 125 to couple the first module 10 and the second module 20 together.

The fastening member 150 may include a screw.

In addition, the insertion terminal 137 of the first module 10 may be inserted into the integration portion 135 of the second module 20 to electrically connect the heaters 130 to each other.

In addition, the packing 140 may be fitted to the insertion portion 117 of the first module 10 so as to be in close contact with the outer circumferential surface. The packing 140 may seal the gap between the first module 10 and the second module 20.

The flow pipe 110 of the first module 10 may be connected to the flow pipe 110 of the second module 20. In detail, the insertion portion 117 of the first module 10 may be inserted into the expanded pipe 115 of the second module 20. At this time, the packing 140 is positioned to be in close contact between the insertion portion 117 of the first module 10 and the expanded pipe 115 of the second module, thereby being capable of sealing the space between the two modules 10.

Accordingly, in a case where the first module 10 and the second module 20 are coupled to each other, there is an advantage that the leakage of steam water (or steam) flowing along the water supply pipe 45, the flow pipe 110 of the first module 10 and the flow pipe 110 of the second module 20 can be prevented.

Thereafter, the third module 30 can be selectively coupled to the second module 20 according to the cavity volume of the cooking device in which the steam generator 1 is installed. For example, in a case where the output of the steam generator 1 coupled with the first module 10 and the second module 20 is insufficient as compared with the volume of the cavity, the user can increase the output of the steam generator 1 by coupling the third module 30 on the upper side of the second module 20.

In other words, the third module 30 may be seated on and coupled with the upper surface 103 of the second module 20.

The coupling process of the third module 30 refers to the coupling process of the first module 10 and the second module 20 described above.

Meanwhile, the disassembly process between the modules of the steam generator 1 will be the reverse of the above-described process of coupling (or assembling) the steam generator 1. Therefore, the disassembly process of the steam generator 1 refers to a process of changing the order of the above-described coupling process.

Figure 5:
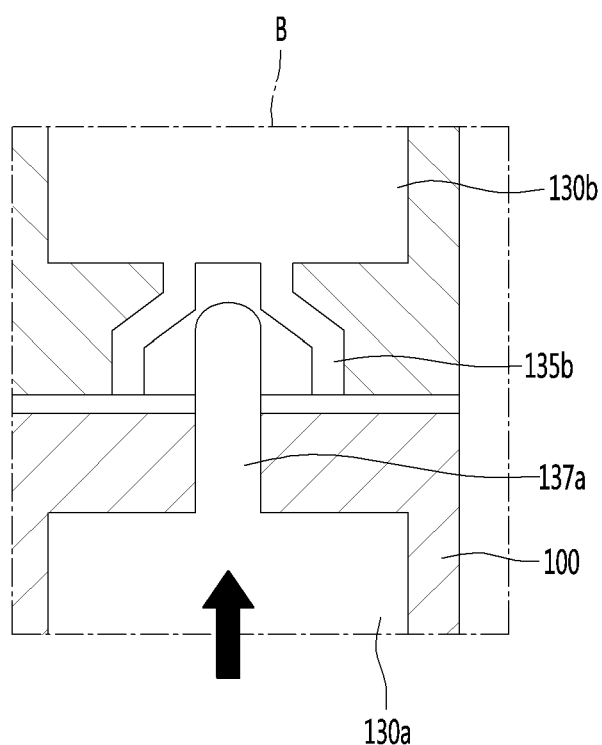
FIG. 5 is an enlarged view illustrating a coupling state of the 'B' portion of FIG. 4.

FIG. 5 is an enlarged view illustrating a state where the 'B' portion of FIG. 4 is coupled.

With reference to FIG. 5, the insertion terminal 137a provided in the heater 130a of the first module 10 can be inserted into the integration portion 135b provided in the heater 130b of the second module 20 while moving upward.

When the insertion terminal 137a comes in contact with the upper end portion of the integration portion 135, electrical connection between the heaters 130a and 130b can be performed.

In order to perform the above-described electrical connection more stable, the integration portion 135 may include a taper shape having an inner diameter reduced toward the upper side.

In other words, the shape of the integration portion 135 may be such that the inner diameter of the lowermost end thereof is larger than the inner diameter of the uppermost end thereof. The integration portion 135 can form a round surface having an inner diameter reduced toward the upper side.

Therefore, the integration portion 135b formed in a tapered shape can stably guide the insertion terminal 137a, which moves upward, to the inner coupling point or the electrical connection point. In other words, the tapered integration portion 135b can improve the integration of the insertion terminal 137a and guide the stable coupling.

Even though all the elements of the embodiments are coupled into one or operated in the combined state, the present disclosure is not limited to such an embodiment. In other words, all the elements may be selectively combined with each other without departing the scope of the invention. Furthermore, when it is described that one comprises (or includes or has) some elements, it should be understood that it may comprise (or include or have) only those elements, or it may comprise (or include or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in descriptive sense only and not for purposes of limitation, and also the technical scope of the invention is not limited to the embodiments. Furthermore, is defined not by the detailed description of the invention but by the appended claims, and all differences within the scope will be construed as being comprised in the present disclosure.

What is claimed is:

1. A steam generator comprising:
   a base module that includes a water supply port configured to receive water; and
   a plurality of steam modules configured to be detachably stacked on an upper side of the base module, each of the plurality of steam modules comprising a main body,
   wherein main bodies of the plurality of steam modules have an identical structure, and
   wherein each of the main bodies includes:
      a flow pipe that extends in a vertical direction along a central axis and that defines a flow path configured to guide steam and water,
      a latching protrusion that extends vertically upward from an outer end of an upper surface of the main body and that defines a space between an outer circumferential surface of the flow pipe and an inner surface of the latching protrusion, the space being configured to seat another steam module among the plurality of steam modules,
      a latching groove that is recessed from a lower portion of the main body toward the flow pipe, that has a shape corresponding to the latching protrusion, and that is configured to receive the latching protrusion of another steam module among the plurality of steam modules inserted from an outside of the main body, and
      a heater that is accommodated inside of the main body, that is disposed outside of the flow pipe, and that is configured to supply heat to the flow pipe, the heater comprising:
         an insertion terminal that extends upward and penetrates the upper surface of the main body, and
         an integration portion that is recessed upward from a lower surface of the main body and that is configured to receive and electrically connect to the insertion terminal of the heater of another steam module among the plurality of steam modules.

2. The steam generator according to claim 1, wherein the plurality of steam modules include a first steam module and a second steam module, and
   wherein the latching protrusion of the first steam module has a shape corresponding to the shape of the latching groove defined by the second steam module.

3. The steam generator according to claim 1, wherein the plurality of steam modules include a first steam module and a second steam module, and
   wherein an upper end portion of the latching protrusion of the first steam module has a shape corresponding to a lower end portion of the latching groove defined by the second steam module.

4. The steam generator according to claim 1, wherein the plurality of steam modules include a first steam module and a second steam module, and
   wherein the latching protrusion of the first steam module defines an upper fastening hole at a central portion of the latching protrusion, the upper fastening hole being configured to guide insertion of a fastening member.

5. The steam generator according to claim 4, wherein the latching groove of the first steam module defines a lower fastening hole configured to receive a fastening member.

6. The steam generator according to claim 1, wherein the flow pipe is connected to the water supply port, and
   wherein the flow pipe and the water supply port are coaxial.

7. The steam generator according to claim 1, wherein the flow pipe includes:
   an expanded pipe portion that is located at a lower side of the flow pipe and that is recessed radially outward from an inner surface of the flow pipe; and
   an insertion portion that extends upward from the upper surface of the main body.

8. The steam generator according to claim 7, wherein the plurality of steam modules include a first steam module and a second steam module, and
   wherein the insertion portion of the first steam module is configured to insert into the expanded pipe portion of the second steam module.

9. The steam generator according to claim 7, wherein the plurality of steam modules include a first steam module and a second steam module,
   wherein the first steam module further includes a packing, and
   wherein a diameter of the packing is greater than an outer diameter of the insertion portion of the first steam module and less than an inner diameter of the expanded pipe portion of the second steam module.

10. The steam generator according to claim 9, wherein the packing is configured to provide a seal between the insertion portion of the first steam module and the expanded pipe portion of the second steam module.

11. The steam generator according to claim 1, wherein the integration portion includes a tapered inner space.

12. The steam generator according to claim 1, wherein the insertion terminal includes a pogo type pin.

13. The steam generator according to claim 1, wherein the base module is configured to detachably couple to a first steam module among the plurality of steam modules.

14. The steam generator according to claim 1, wherein the plurality of steam modules include a first steam module and a second steam module, and
   wherein an outer surface of the main body of the first steam module is flush with an outer surface of the main body of the second steam module.

15. The steam generator according to claim 1, wherein the flow pipe of each of the plurality of steam modules has an upper opening and a lower opening, the central axis passing through centers of the upper opening and the lower opening.

16. The steam generator according to claim 15, wherein the plurality of steam modules include a first steam module and a second steam module stacked on the first steam module, and wherein the upper opening of the flow pipe of the first steam module directly faces and is in communication with the lower opening of the flow pipe of the second steam module.

17. The steam generator according to claim 16, wherein a diameter of the upper opening of the flow pipe of the first steam module about the central axis is equal to a diameter of the lower opening of the flow pipe of the second steam module about the central axis.

\* \* \* \* \*